United States Patent
Rosenstein et al.

(10) Patent No.: US 7,266,109 B1
(45) Date of Patent: Sep. 4, 2007

(54) SYSTEM AND METHOD FOR PROVIDING BASE BAND VOICE TELEPHONY USING DERIVED VOICE OVER DATA TECHNOLOGY

(75) Inventors: David E. Rosenstein, Palo Alto, CA (US); Yasantha N. Rajakarunanayake, San Ramon, CA (US); Gregory F. Wetzel, San Jose, CA (US)

(73) Assignee: Covad Communications Group, Inc., San Jose, CA (US)

( * ) Notice: Subject to any disclaimer, the term of this patent is extended or adjusted under 35 U.S.C. 154(b) by 0 days.

(21) Appl. No.: 09/420,918

(22) Filed: Oct. 20, 1999

Related U.S. Application Data (60) Provisional application No. 60/154,344, filed on Sep. 16, 1999.

(51) Int. Cl.
*H04L 12/66* (2006.01)
*H04J 1/02* (2006.01)

(52) U.S. Cl. ...................... 370/352; 370/494

(58) Field of Classification Search ........ 370/352–356, 370/328, 395.1, 420, 395.52, 401, 466, 537, 370/901, 905, 907, 916, 467, 419, 463, 494, 370/465, 493
See application file for complete search history.

(56) References Cited

U.S. PATENT DOCUMENTS

| | | | |
|---|---|---|---|
| 6,028,867 A | | 2/2000 | Rawson et al. |
| 6,081,517 A | * | 6/2000 | Liu et al. .................... 370/352 |
| 6,259,708 B1 | * | 7/2001 | Cheng et al. ............... 370/493 |
| 6,286,049 B1 | | 9/2001 | Rajakarunanayake et al. |
| 6,298,062 B1 | * | 10/2001 | Gardell et al. .............. 370/401 |
| 6,335,936 B1 | * | 1/2002 | Bossemeyer, Jr. et al. .. 370/420 |
| 6,349,096 B1 | * | 2/2002 | Liu et al. .................... 370/352 |
| 6,388,990 B1 | | 5/2002 | Wetzel |
| 6,404,764 B1 | * | 6/2002 | Jones et al. ................. 370/352 |
| 6,459,702 B1 | | 10/2002 | Saaverda et al. |
| 6,463,079 B2 | | 10/2002 | Sundaresan et al. |
| 6,463,144 B1 | * | 10/2002 | Dunn et al. ............ 379/210.01 |
| 6,463,528 B1 | | 10/2002 | Rajakarunanayake et al. |
| 6,510,152 B1 | * | 1/2003 | Gerszberg et al. .......... 370/352 |
| 6,512,764 B1 | * | 1/2003 | Carew et al. ............... 370/356 |
| 6,538,998 B1 | | 3/2003 | Garimella |
| 6,563,816 B1 | * | 5/2003 | Nodoushani et al. ........ 370/352 |

(Continued)

*Primary Examiner*—Daniel J. Ryman
(74) *Attorney, Agent, or Firm*—Fenwick & West LLP (57) ABSTRACT

Systems and methods for offering base band voice telephony while using derived voice over data technology such as VoATM or VoIP are disclosed. The system may generally comprise a derived voice over data termination device located outside of the client premise and a connection between the client premise and the derived voice over data termination device, where the connection between the client premise and the derived voice over data termination device is a base-band analog voice loop. The derived voice over data termination device is configured to convert between base band signals and derived voice over data signals utilizing derived voice over data technology. The method generally comprises providing a derived voice over data termination device in a wire center, providing a base band connection between the client telephone and the derived voice over data termination device, transmitting base-band analog signals between the client telephone and the derived voice over data termination device, and transmitting derived voice over data signals between the derived voice over data termination device and a voice gateway connected to a public switched telephone network.

11 Claims, 5 Drawing Sheets

U.S. PATENT DOCUMENTS

| | | |
|---|---|---|
| 6,580,718 B1 | 6/2003 | Chapman |
| 6,584,074 B1 | 6/2003 | Vasamsetti et al. |
| 6,587,883 B1 | 7/2003 | Rajakarunanayake |
| 6,594,695 B1 | 7/2003 | Vasamsetti et al. |
| 6,631,120 B1 * | 10/2003 | Milbrandt .................. 370/252 |
| 6,640,239 B1 * | 10/2003 | Gidwani ..................... 709/203 |
| 6,657,994 B1 | 12/2003 | Rajakarunanayake |
| 6,954,454 B1 * | 10/2005 | Schuster et al. ............ 370/352 |

* cited by examiner

SYSTEM AND METHOD FOR PROVIDING BASE BAND VOICE TELEPHONY USING DERIVED VOICE OVER DATA TECHNOLOGY

CROSS REFERENCE TO RELATED APPLICATION

This application claims priority to U.S. Provisional Patent Application No. 60/154,344, entitled "System And Method For Providing Voice Telephony Using Derived Voice Over Data Technology," filed Sep. 16, 1999, the entirety of which is incorporated by reference herein.

BACKGROUND OF THE INVENTION

1. Field of the Invention

The present invention relates generally to base band voice telephony using derived voice over data technology. More specifically, systems and methods for providing base band voice telephony to a client premise using derived voice over data technology are disclosed.

2. Description of Related Art

Voice over asynchronous transfer mode ("VoATM") technology (or voice over digital subscriber line technology, "VoDSL") technology is increasingly being utilized to provide derived, multiple voice line capabilities over a digital subscriber line ("DSL") operating over twisted pair copper phone lines. VoATM technology involves digital transmission of voice conversations over ATM networks while voice conversations are traditionally carried over base band analog phone lines. Typically, the VoATM process involves segmenting a stream of synchronous voice signals into cells, or packets, each with a header, and interleaving the cells into the ATM network with cells from other sources, and eventually delivering the cells to their respective destination where they are converted back into a synchronous data stream.

VoATM may be implemented over DSL utilizing any DSL technology. In particular, VoATM works particularly well for single-line or symmetric DSL ("SDSL") loops using voice client or customer premise equipment ("CPE") capable of providing multiple derived voice lines over a single DSL line. SDSL offers in a single 2-wire implementation and, currently, a symmetric data rate of up to 1.1 Mbps or 2.048 Mbps in light of recent improvements. Such CPEs may enable 16 or more telephone lines as well as high-speed data connection, such as Internet access, to be delivered over a single DSL connection. The CPE may provide a plurality of standard analog plain old telephone service ("POTS") ports allowing connections for phone sets, facsimile machines, and modems. The derived voice lines optionally supports various features such as caller ID, call waiting, and messaging. The CPE may include a router to providing bridging and Internet protocol ("IP/IPX") routing to support applications for high-speed data access such as to the Internet and/or a corporate network. FlowPoint™ 2200V Integrated Access Device ("IAD") provided through FlowPoint Corporation (Los Gatos, Calif.) is an example of a CPE device suitable for providing digitized voice features and high-speed Internet and corporate data access over one SDSL.

In addition to SDSL, various other types of DSL technologies have been developed and utilized. One example is an asymmetrical DSL ("ADSL") which can simultaneously transport high-bit-rate digital information towards the subscriber, lower rate data from the client, and analog voice all via a single twisted wire pair. Other technologies have been or are being developed which can similarly allow the simultaneously transmission of digital data signals and analog voice signals via a single twisted wire pair.

CPEs typically connect over ATM virtual circuits ("VCs") to a voice gateway device, which may be common to a metropolitan area. Examples of virtual circuits include permanent virtual circuit ("PVC"), soft or smart PVC ("SPVC"), and switched virtual circuit ("SVC"). The voice gateway is capable of providing a standard interface to voice network devices or switches.

However, in order to provide telephone service to a client, a provider generally requires the client to subscribe to DSL data services and/or to have a VoATM CPE at the client premise. Such requirements increase the complexity and cost of subscribing to VoATM services, including voice telephone using derived voice over data technology. Thus, what is needed is a simpler and cost-effective system and method for utilizing derived voice over data technology, such as DSL and VoATM technologies, to provide voice telephony service to a client premise.

SUMMARY OF THE INVENTION

Systems and methods for offering primary line voice telephone and data services over DSL are disclosed. It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. Several inventive embodiments of the present invention are described below.

A system for providing voice telephony using derived voice over data technology, such as voice over ATM ("VoATM") or voice over Internet Protocol ("VoIP") technology, to a client premise is disclosed. The system may generally comprise a derived voice over data termination device located outside of the client premise and a connection between the client premise and the derived voice over data termination device, where the connection between the client premise and the derived voice over data termination device is a base-band analog voice loop. The derived voice over data termination device is configured to convert between base band signals and derived voice over data signals utilizing derived voice over data technology.

The system may further include a digital subscriber line access multiplexer ("DSLAM") coupled between the derived voice over data termination device and an ATM switch, a frame relay switch, or a router. The derived voice over data termination device is preferably located in a central office or other wire center. In one embodiment, the connection between the client premise and the VoATM termination device is a loop that transmits both base band analog and DSL signals, such as an ADSL loop, over a single twisted pair copper wire. ADSL provides both a data channel and a base band channel over a single wire pair.

In another embodiment, the system may further comprise a customer or client premise equipment ("CPE") which may be coupled to the connection between the client premise and the derived voice over data termination device. A plain old telephone service ("POTS") splitter may be provided, such as in the central office, to split the digital data signals and the analog voice signals. Micro-filters may be used at each POTS jack to allow voice signals to be transmitted while filtering out data signals. Further, the derived voice over data termination device may support transmission technologies such as DS1, DS3, OC3, OC12, Ethernet, E3, E1, OC48 transmission, and xDSL transmission technologies, including SDSL and ADSL transmission technologies.

In yet another embodiment, a derived voice over data packet network is disclosed. The derived voice over data packet network may generally comprise a derived voice over data termination device located in a wire center and coupled to a client premise and a derived voice over data switch coupled to a voice gateway and to a public switched telephone network.

In a further embodiment, a method for providing base band voice telephony using derived voice over data, such as VoATM or VoIP, to a client telephone is disclosed. The method generally comprises providing a derived voice over data termination device in a wire center, providing a base band connection between the client telephone and the derived voice over data termination device, transmitting base-band analog signals between the client telephone and the derived voice over data termination device, and transmitting derived voice over data signals between the derived voice over data termination device and a voice gateway connected to a public switched telephone network.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DESCRIPTION OF SPECIFIC EMBODIMENTS

Systems and methods for providing base band voice telephony, and preferably primary line voice telephony, using derived voice over data technology, such as VoATM over DSL, VoIP, and voice over frame relay ("VoFR") are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention may not be described or shown in detail so as not to unnecessarily obscure the present invention.

Overview of a General VoATM Network

Figure 1:
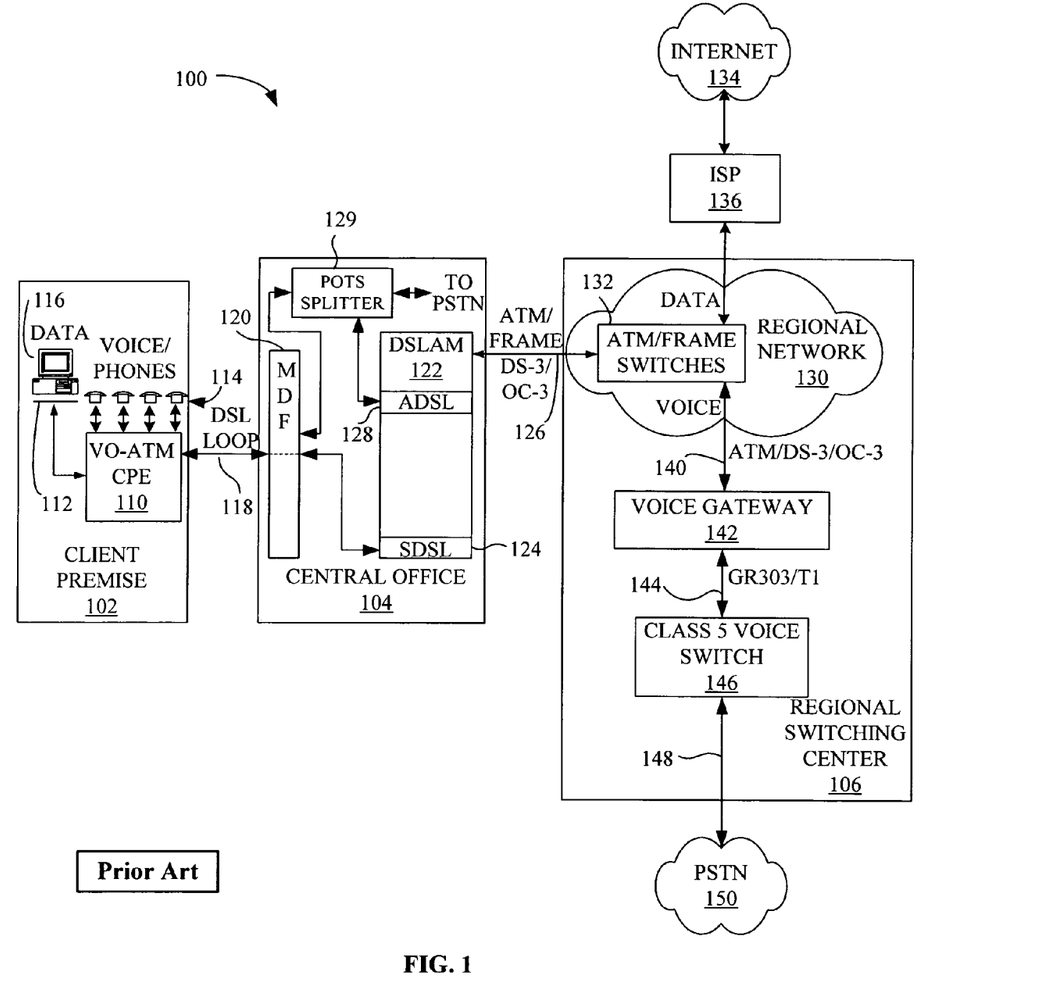
FIG. 1 is a block diagram illustrating a typical VoATM architecture.
Figure 2:
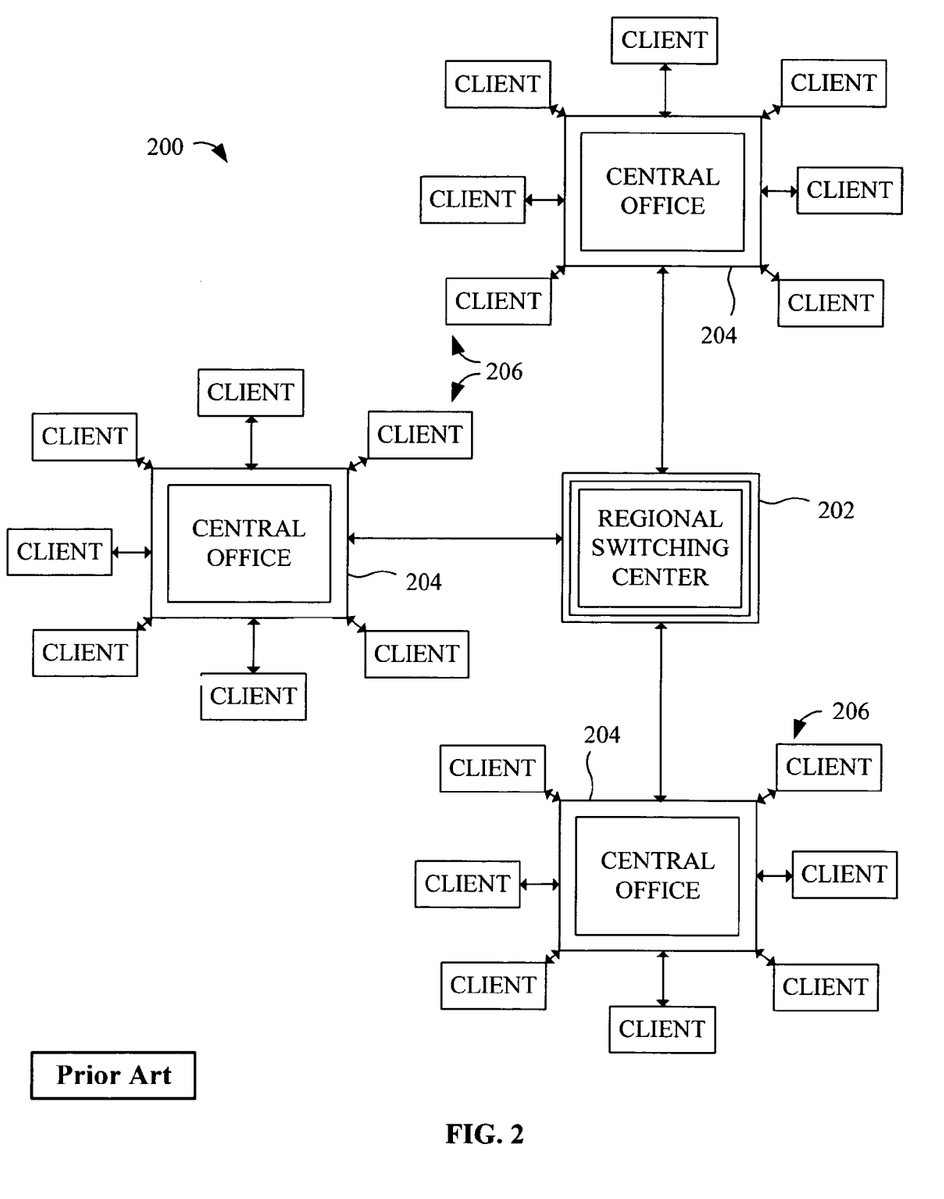
FIG. 2 is a block diagram illustrating the interconnections between a regional switching center and a plurality of central offices each connected to various client premises.

A general introduction using, as an example, a typical architecture of a VoATM network will be presented with reference to FIGS. 1 and 2, which will serve as basis for subsequent discussion of the systems and methods for providing base band voice telephony using derived voice over data technology, for example. FIG. 1 shows a block diagram illustrating a typical architecture of a VoATM packet network 100. The VoATM architecture 100 generally comprises connections among equipment at a client premise 102, a switching station or a central office ("CO") 104, and a regional switching center 106.

A VoATM CPE 110 is provided at the client premise 102. One or more LANs or Ethernets 112 at the client premise 102 may be connected to one or more data ports of the CPE 110 and one or more telephones, facsimile machines, or modems 114 at the client premise 102 may be connected to one or more voice ports of the CPE 110. One or more computers 116 at the client premise 102 may be connected to the LANs 112.

A typical derived voice over data CPE 110 may include multiple active voice ports providing dial tone from a voice provider via a Class-5 switch. Each derived voice over data line requires a bandwidth of approximately 64 kbps plus a certain amount of overhead for a total of approximately a bandwidth of approximately 80 kbps for each derived voice line. In addition, if a compression technology, such as adaptive differential pulse code modulation ("ADPCM") voice encoding technology, is used, the voice over data line requires less than 80 kbps in bandwidth. On relatively short length DSL loops, SDSL technology enables a rate of 1.1 Mbps or 1.544 Mbps in light of recent improvements such that numerous voice lines may be carried over a single twisted metal wire pair, preferably twisted copper wire pair.

The VoATM CPE 110 at the client premise 102 is connected to a DSL link or loop 118 which is a twisted pair of copper phone lines connected to a main distribution frame ("MDF") 120 in the central office 104. The MDF 120 simply serves to aggregate various twisted pairs of copper phone lines from various client premises within a certain geographical region.

The twisted pairs of copper phone lines comprising DSL loops are connected to a DSL access multiplexer ("DSLAM") 122 via the MDF 120. The DSLAM includes a plurality of ports, such as an SDSL port 124 to which the DSL loop 118 may be connected. Signals delivered and sent via the DSL loop 118 to and from the client premise 102 are multiplexed through DSLAM 122 via the SDSL port 124 along with signals from other client premises (not shown).

The DSLAM 122 may provide one or more of at least the following types of ports: xDSL, DS1, DS3, OC-3, OC-12, Ethernet, E3, E1 and OC48. The term xDSL refers to all types of DSL including ADSL, SDSL, rate adaptive DSL ("RADSL"), high-bit-rate DSL ("HDSL"), and very high-bit-rate DSL ("VDSL").

Where the DSL loop 118 carries both base band voice signals and digital data signals, such as in the case of an ADSL loop, the DSL loop 118 alternatively may be connected to an ADSL port 128 such that signals delivered and sent via the DSL loop 118 to and from the CPE 110 at the client premise 102 are multiplexed through DSLAM 122.

ADSL offers in a single wire pair implementation the combination of a high-bit-rate channel that can deliver a one-way data rate of approximately 64 kbps to 8 Mbps to the remote user or client, a slower rate channel that can deliver a one-way data rate of approximately 32 kbps and to 1 Mbps, as well as an analog voice channel that can deliver base band voice signals. ADSL technology includes various forms of ADSL such as ITU-T G.992.1/G.DMT and ITU-T G.992.2/ G.lite.

Where ADSL technology is utilized, an ADSL CPE is provided at the client premise 102. As is known in the art, an ADSL CPE may provide a base-band analog voice port, a data port, and/or one or more derived voice over data ports. The ADSL CPE is connected to the MDF 120 in the central office 104 via the DSL loop 118. The MDF 120 is in turn connected to a POTS splitter 129 in order to send and receive data and derived voice over data signals between the MDF and the DSLAM 122 and in order to send and receive base-band analog voice signals to the PSTN via a voice switch or gateway (not shown) of a conventional analog telephone service provider using conventional telephone methodologies.

Traffic from a number of central offices may be aggregated on a regional network 130 in a regional switching center 106. The DSLAM 122 of the central office 104 connects to a network of switches or routers such as ATM/Frame switches 132 in the regional network 130 via ATM over link 126, such as a DS-3 or OC-3 link. In other words, the DSLAM 122 multiplexes the ATM signals from multiple DSL lines onto a high-capacity transmission line for providing an ATM protocol connection between the DSL lines such as DSL line 118 and the ATM network switches 132 in the regional network 130. Data signals are delivered to and received from the Internet 134 via an Internet service provider ("ISP") 136. Although not shown, data signals may be alternatively or additionally delivered to and received from a corporate network.

Voice signals may be transmitted over an interface 140 between the ATM/Frame switches 132 and a voice over data gateway 142. The voice over data gateway 142 may support voice over ATM, frame relay, and IP, for example. DS-3 refers to digital signal level 3 within a digital transmission speed category that may be used on T3 systems and transmits at 44.736 Mbps. DS-3 is primarily used in Northern America and Japan. OC-3 refers to optical carrier level 3 having a rate of 155.52 Mbps and is one of a series of transport levels defined in conjunction with synchronous optical network ("SONET"). As is evident, other suitable signal and signal carrying systems such as European's E-system, e.g., the E3, similar to the DS-3, may be utilized and the particular system utilized may depend upon the signal and signal carrying systems used in a particular locale.

Voice over data signals may be further transmitted over a link such as a GR303 or a T1 interface 144 between the voice over ATM gateway 142 and a Class-5 voice switch 146. T1 is a communications carrier transmission system. Finally, voice over data signals may be transmitted over an interface 148 between the Class-5 voice switch 146 and a public switched telephone network ("PSTN") 150. The interface 148 typically comprises several T1 lines. The voice over ATM gateway 142, the Class-5 voice switch 146, the PSTN 150, and their interfaces 144, 148 are well known in the art and are not discussed in further detail herein for purposes of clarity.

Although not shown, the client premises 102 may include another telephone connected to a primary voice line, which is in turn connected to the MDF 120 in the CO 104. The primary voice line is a typical base-band analog voice loop such that no special equipment other than a conventional telephone, a conventional telephone jack, and a microfilter or an NID, for example, are needed. The telephone line may be directly connected to a Class-5 switch via the MDF 120.

FIG. 2 shows a block diagram illustrating a network 200 residing within a community. The network 200 includes interconnections between a regional switching center 202 and each of a plurality of COs 204. Each CO 204 is connected to a plurality of client premises 206 and to the regional switching center 202.

Typically, an incumbent local exchange carrier ("ILEC") owns and operates the COs 204 and the twisted copper pair lines between the COs and the client premises. Competitive local exchange carriers ("CLECs") typically do not own any traditional voice equipment in the telephone company COs 1204 nor the lines between the COs and the client premises. CLECs generally lease twisted copper pair lines between the COs 204 and the client premises 206 in order to provide services to the client premises 206.

The local network 200 may be provided within a community to enable a CLEC to have immediate broad coverage within the community. In particular, for each community in which the CLEC wishes to provide service, the CLEC may locate the regional switching center 202 at a central location within the community and run or lease fiber facilities from the regional switching center 202 to each of the ILEC COs 204 within the community. Further, the CLEC need only provide one voice gateway and one Class-5 switch for each regional switching center 202 rather than for each CO 204, as the ILEC currently provides. It is to be understood that the number of voice gateways and the number of class 5 switches provided by the CLEC are typically independent of each other.

Because the ATM network is a distributed network, only a few regional switching centers need to be provided for hundreds of COs. For example, in the San Francisco Bay Area, only four or five regional switching centers may need to be provided to interconnect many or all the COs in the entire area.

Primary Line Voice Telephony Using Derived Voice Over Data Technologies

An overview of a general VoATM network architecture having been presented, the systems and methods for providing voice telephony, and preferably primary line voice telephony, using derived voice over data will now be described in more detail with reference to FIGS. 3-5. For purposes of clarity and by way of example, an embodiment utilizing VoATM technology is described below although any suitable derived voice over data technologies, such as derived voice over IP, derived voice over frame relay, derived voice over data network technologies and other derived voice over data technologies, may be implemented.

Figure 3:
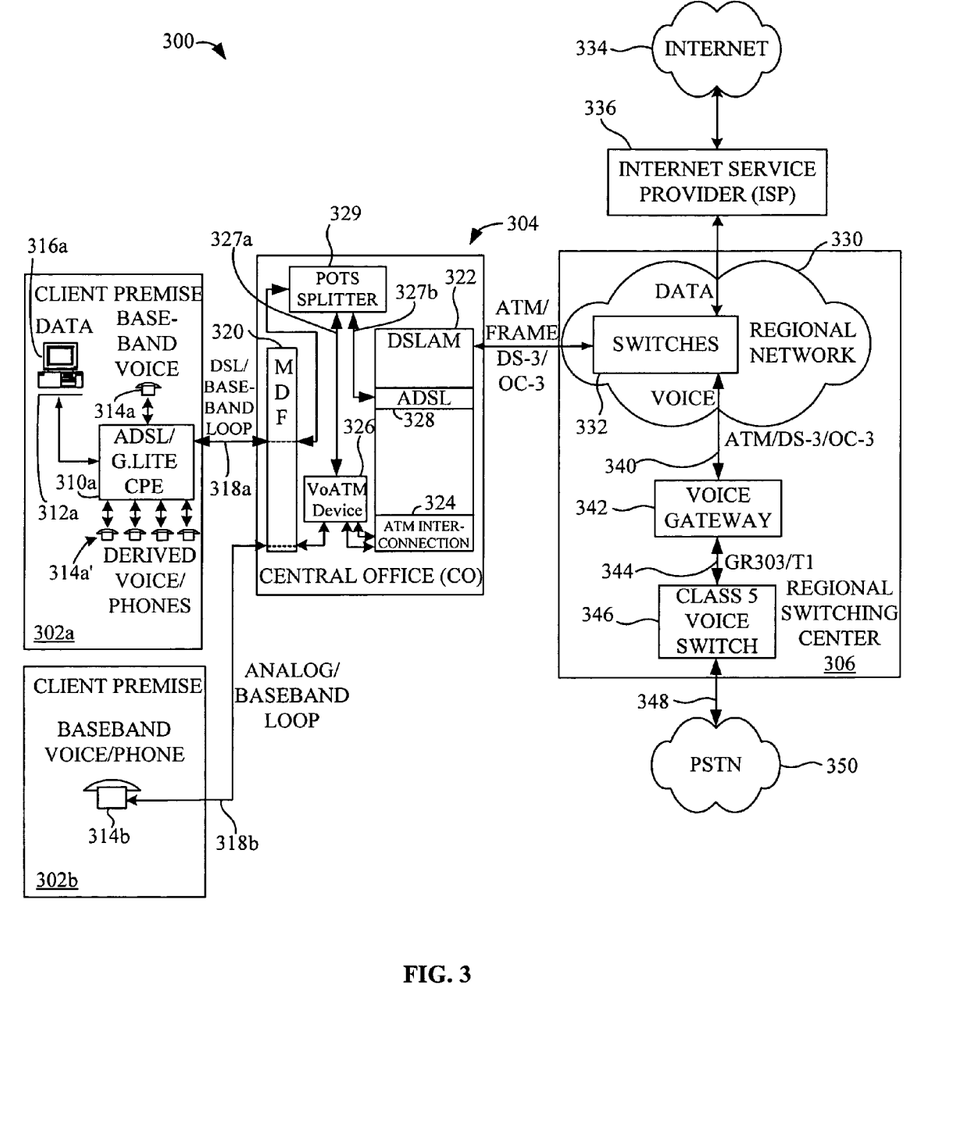
FIG. 3 is a block diagram illustrating a modified VoATM network for providing analog voice telephony to a remotely located client.

FIG. 3 is a block diagram illustrating a modified VoATM packet network 300 for providing base band or analog voice telephony to a client premise using derived voice over data technology, and more specifically, VoATM over DSL technology. The modified VoATM network 300 may generally comprise connections among client premises 302, a CO 304, and a regional switching center 306. However, rather than providing a VoATM over DSL CPE at the client premise 302, a derived voice termination device 326 is provided outside of the client premise 302 and preferably in the CO 304 or other wire center. A wire center broadly refers to a location outside of a client premise where the derived voice termination device resides, such as in the central office, a common area, such as a basement of a multi-dwelling building, a remote terminal, or a controlled environment vault.

Referring again to the typical VoATM network of FIG. 1, because the dial-tone from voice ports of a derived voice over data CPE such as a VoATM CPE 110 shown in FIG. 1 can be transported over distances up to 18,000 feet without significant loss of quality, the technology enabling the derived voice capability, i.e. the derived voice CPE, can be moved outside of the client premises 302 and into, for example, the CO 304. Therefore, the technology in an existing VoATM CPE may be placed in a CO as a VoATM termination device 326 with proper modifications to comply with the NEBS encasing and form requirements and adapted to generate sufficient line current and voltage to drive the operation of a remote telephone. In other words, the derived voice termination device refers to the derived voice device placed outside of the client premise, such as in a CO. Optionally, the VoATM termination device may support many more ports than a VoATM CPE because it can be connected to the DSLAM with higher bandwidth lines.

The VoATM termination device is configured to convert between base band signals and derived voice signals utilizing derived voice over data technology or, more specifically in the embodiment shown in FIG. 3, VoATM signals utilizing derived voice over ATM technology. For example, the derived voice signals may be packetized digital signals. Although not preferred, circuit switched digital voice may alternatively be utilized. As is evident, base band signals are transmitted between the client premise 302 and the voice over data termination device 326 via loop 318 while derived voice over data signals are transmitted between the voice over data termination device 326 and the DSLAM 322. Although a DSLAM 322 is typically and preferably provided, a switch (not shown) may be alternatively connected the voice over data termination device 326 to a network of switches or routers 332 of the regional network 330.

The modified VoATM network 300 thus provides a simpler and more cost effective network and allows the client to subscribe to base band voice-only or base band voice with data services. In particular, the modified VoATM network 300 allows the use of analog frequency spectrum for a primary line as the network devices are optionally powered by the electrical power supply in the CO. Further, the client may reliably subscribe to a primary voice line through a CLEC using derived voice over data technology. Specifically, because the VoATM termination device 326 is located in the CO 304, the VoATM termination device 326 is powered by the same power which runs an ILEC's traditional base-band analog voice lines between the CO and the client premise. As such, the base band voice telephony service would not suffer from power failures at the customer premise as the base band telephony service is powered by the voice over data termination device 326 which is in turn powered by the electrical supply in the CO.

FIG. 3 illustrates two examples of clients premises 302a, 302b connected to the CO 304. At a first client premise 302a, an ADSL, or any other base band and data signal technology, and a CPE 310a may be provided. Generally, the CPE 310a provides one or more data ports, one or more derived voice ports, and a single base-band voice port for each DSL/base band loop 318a. The one or more data ports may be connected to one or more LANs or Ethernets 312a, the base-band voice port may be connected to a conventional telephone, facsimile machine, or modem 314a, and the one or more derived voice ports may be connected to one or more telephones, facsimile machines, or modems 314a'. One or more computers 316a may be connected to the LANs or Ethernets 312a.

Although the CPE 310a may serve the functions of both a splitter and a device to support data signals, a splitter may be additionally provided at the client premise 302 to split the base band voice signals and the data signals such that base band voice signals are transmitted between the splitter and a base band voice device and the digital data signals are transmitted between the splitter and a CPE supporting data signals.

As shown, the CPE 310a is connected via a DSL/base band loop 318a, such as an ADSL loop, to an MDF 320 in the CO 304. The MDF 320 is connected to a POTS splitter 329. The POTS splitter 329 facilitates the sending and receiving of data and derived voice over data signals between the MDF and a DSLAM 322 as well as the sending and receiving of base band voice signals between the MDF and the VoATM termination device 326. The connection to the termination device 326 is preferably protected by a low pass filter. The POTS splitter 329 is optionally as defined in ANSI T1.413 issue 2, Annex E. Although the splitter 329 and the VoATM termination device 326 are shown as separate devices, they may be integrated as a single device performing the same or similar functions as the two separate devices.

Analog voice signals are sent to and received from the VoATM termination device 326 via link 327a while data and derived voice over data signals are sent to and received from an ADSL port 328 of the DSLAM 322 via link 327b. Thus, rather than sending and receiving base-band analog voice signals to a voice gateway of a conventional analog telephone service provider using conventional telephone methodologies, the VoATM network 300 utilizes the VoATM termination device 326 to receive analog voice signals from the POTS splitter 329 and to deliver derived voice over data signals to an ATM interconnection port 324, such as an SDSL port, of the DSLAM 322, and vice versa.

The VoATM termination device 326 provides connections between the DSL loop 318a via the MDF 320 and the ATM interconnection port 324 of the DSLAM 322. Preferably, the DSLAM 322 provides a separate ATM interconnection port and a separate ADSL port for each connection to each client premise. Signals delivered and sent via the DSL loop 318a to the client premise 302a are multiplexed through DSLAM 322. The VoATM termination device 326 converts derived voice over data signals to and from base band analog voice signals, similar to the functions performed by the VoATM CPE 110 shown in and described with reference to FIG. 1.

The DSLAM 322 is in turn connected to ATM/Frame switches 332 in a regional network 330. Although an ATM or a frame switch is described by way of example, any other suitable switch or router may be utilized. Data signals from the switches 332 are delivered to and received from the Internet 334 via an ISP 336. Although not shown, data signals may be alternatively or additionally delivered to and received from a corporate network. Voice signals may be transmitted over an interface 340, such as an ATM, DS-3, or OC-3 interface, between the switches 332 and a voice gateway 342, such as a voice over ATM gateway. Voice signals may be further transmitted over an interface 344, e.g., GR 303 or T1 interface, between the voice gateway 342 and a Class-5 voice switch 346. Finally, voice signals may be transmitted over an interface 348 between the Class-5 voice switch 346 and a PSTN 350.

The configuration and architecture of the regional switching center 306 is similar to the regional switching center 106 shown in and described above with reference to FIG. 1. Thus, for purposes of clarity, the regional switching center 306 will not be further described in detail.

Although the data service is described as provided using various ADSL technologies, any suitable xDSL technology may be utilized. However, for clients with ADSL access, the base band dial-tone from the VoATM termination device 326 residing in the CO 304 can be mapped onto the base-band voice channel of ADSL to further simplify the provision of a voice line.

At a second client premise 302b, the client subscribes only to one telephone line or telephone number and does not subscribe to data services such that no additional CPE other than a conventional telephone jack and a conventional telephone 314b are needed. As is evident, although a telephone 314b is shown, any other device utilizing voice signals, such as a facsimile machine or a dial-up modem can be provided.

In the case of a base band voice only service, a base band loop 318b is provided between the client premise 302b and the CO 304. Base band voice signals from the telephone 314b are delivered via a conventional base-band analog loop over a conventional twisted pair copper wire 318b to the MDF 320 in the CO 304. The CO 304 provides connections between the loop 318b and the VoATM termination device 326 via the MDF 320. Analog voice signals are delivered between the VoATM termination device 326 and the telephone 314b via the MDF 320 and the base-band loop 318b. The termination device 326 converts the base band voice signals from the client premise 302b to derived voice signals to be transmitted to the DSLAM 322 and vice versa.

The VoATM termination device 326 further provides connections between the MDF 320 and the ATM interconnection port 324 of the DSLAM 322. Signals delivered and sent via the loop 318b to the client premise 302b are multiplexed through DSLAM 322. As the signals carried by the loop 318b do not include data signals, the loop 318b is not connected to any ADSL ports of the DSLAM 322.

As is evident, repositioning of the VoATM device out of the client premise 302 and into, for example, the CO 304 enables non-ILEC service providers such CLECs to provide dial-tone over standard copper loops to any client such as a household or a business. Where a client subscribes to one or more base-band analog telephone lines, each over a traditional analog/base-band loop via a twisted copper pair, no CPE other than the conventional telephone jack and telephone are necessary to establish such telephone service. The client may subscribe to a base band primary voice line through a CLEC without DSL data service. Thus, particularly in the embodiment with a single telephone line service client, a voice line, and preferably a primary voice line, may be provided to the client simply, reliably, and cost effectively.

Although not shown, the termination device 326 may be connected directly to the switches 332 or directly to the voice gateway 342, rather than via the DSLAM 322. In addition, the voice services for the clients are typically provided by voice service providers and the number of such voice service providers is generally only limited to the number of ports of the voice gateway 342 or the class 5 voice switch 346 as the network 300 is a packet switched network. In other words, the packet switched network provides an efficient way to connect to a number of voice service providers.

The ATM interconnection port 324 of the DSLAM 322 may implement any suitable ATM-based methodologies. Examples of suitable derived voice over data or ATM-based methodologies include but are not limited to xDSL, DS1, DS3, OC-3, OC-12, Ethernet, E1, E3, OC48, and other appropriate packet data networking technologies. For example, a configuration in which the VoATM device is connected to a DS3 port of the DSLAM may be implemented, the DS3 port being an ATM interconnection port implementing the ATM-based DS3 methodology such that the VoATM network is adapted for larger deployments. Specifically, a modified VoATM termination device is connected via a DS3 ATM line that can be attached to the DSLAM, i.e. a DS3 subtend, such that a large port concentration of approximately over 250 voice lines may be supported for scalability.

Figure 4:
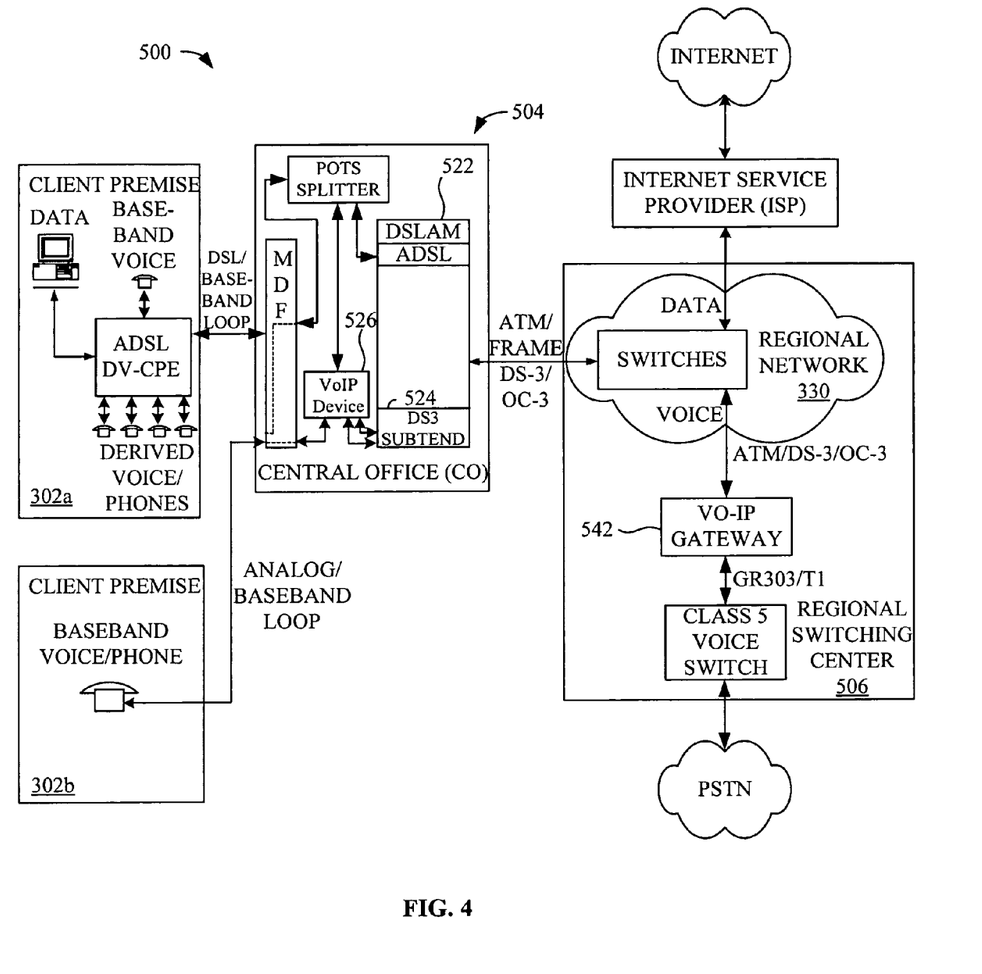
FIG. 4 is a block diagram illustrating a system and method for providing voice telephony using voice over Internet Protocol ("VoIP") technology.

FIG. 4 is a block diagram illustrating a system and method for providing voice telephone using voice over Internet Protocol ("VoIP") technology. Similar to the VoATM network 300 described above with reference to FIG. 3, the VoIP network 500 may generally comprise connections among client premises 302a, 302b, a CO 504, and a regional switching center 506. However, the VoIP network 500 utilizes IP technology rather than ATM technology. Specifically, a VoIP termination device 526 is provided in the CO 504. The VoIP termination device 526 may also be a DS3 IP backhaul that can be subtended off of the DSLAM 522, i.e. the DS3 subtend port 524, such that a large port concentration of telephone lines may be supported for scalability. Although preferred, the VoIP termination device 526 need not be a DS3 IP backhaul subtending off of the DSLAM 522. For example, the VoIP termination device 526 may be connected to a ATM interconnection port (not shown) such as an SDSL port of the DSLAM 522.

Although shown separately, the VoATM termination device 326 of FIG. 3, the VoIP termination device 526 of FIG. 4, and/or any other termination devices may be implemented in a single CO.

In the regional switching center 506, rather than providing a VoATM gateway, a VoIP gateway 542 is provided. The regional switching center 506 otherwise has similar functions, interconnections, and configurations as the regional switching center 306 shown in and described with reference to FIG. 3.

Figure 5:
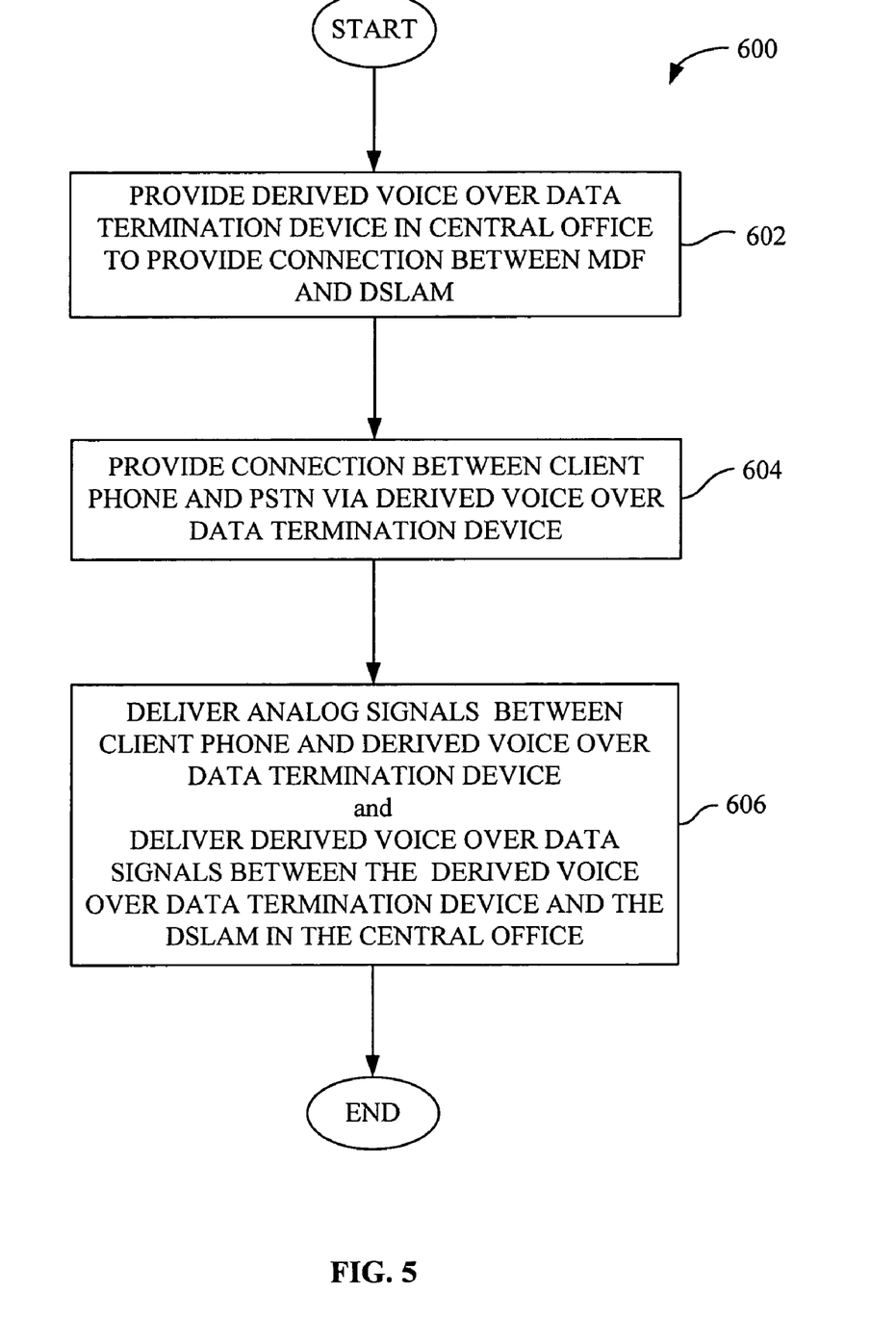
FIG. 5 is a flow chart illustrating a process for providing voice telephony using derived voice over data technology.

FIG. 5 is a flow chart illustrating a process 600 for providing voice telephony using derived voice over data technology such as VoATM over DSL or VoIP. At step 602, a derived voice over data termination device, such as a VoATM or a VoIP termination device, is provided in the central office to provide connection between a MDF and a DSLAM in the CO. Then, at step 604, a connection between client phone(s) and PSTN via derived voice over data termination device and the DSLAM in the CO is provided. Finally, at step 606, base-band analog voice signals are transmitted between the derived voice over data termination device in the CO and the client phone at the client premise. Also at step 606, derived voice over data signals are transmitted between the derived voice over data termination device and the DSLAM in the CO. Derived voice over data signals, such as in the form of ATM packets or cells, are delivered between the termination device and the DSLAM and further to a network of switches connected to the PSTN via a voice gateway and a class 5 voice switch.

The above-described embodiments of the voice telephony using VoATM over DSL or VoIP enable CLECs to enter into consumer, primary-line voice markets. Thus, the above-described voice telephony using VoATM over xDSL or VoIP significantly enhances the scope of CLECs' VoATM solution and enables ubiquitous deployment of voice services.

For purpose of clarity, details relating to technical material that is known in the technical fields related to the invention may not be described or shown in detail so as not to unnecessarily obscure the present invention. For example, various terminology utilized herein, such as DS1, DS3, OC3, OC12, DSL, VoATM, etc., are known to those of ordinary skill in the art. Definitions of these terminology along with other related information and background can generally be found in "Understanding Digital Subscriber Line Technology," Starr, Cioffi, and Silveman, Prentice Hall, 1999, the entirety of which is incorporated by reference herein.

While the above is a complete description of preferred embodiments of the invention, various alternatives, modifications, and equivalents can be used. For example, derived voice over data is not limited to VoATM and VoIP technologies and other derived voice over data technologies such as voice over frame relay (VoFR) and voice over data network technologies may be utilized, each employing, for example, a VoFR termination device or voice over data network termination device, respectively. It should be evident that the invention is equally applicable by making appropriate modifications to the embodiments described above. As another example, the derived voice termination device need not be located in the central office. Rather, the derived voice termination device may be located anywhere outside of the client premise and connected between the client premise and the central office. Therefore, the above description should not be taken as limiting the scope of the invention that is defined by the appended claims along with their full scope of equivalents.

What is claimed is:

1. A system using derived voice over data technology to provide analog voice telephony to a client premise, comprising:
    a derived voice over data termination device located outside of the client premise, said derived voice over data termination device configured to convert between base band signals and derived voice over data signals utilizing derived voice over data technology;
    a connection between the client premise and the derived voice over data termination device, wherein the connection between the client premise and the derived voice over data termination device is over a twisted wire pair and carries analog frequencies;
    a digital subscriber line access multiplexer coupled between the derived voice over data termination device and one of an ATM switch, a frame relay switch, and a router, the digital subscriber line access multiplexer being configured to multiplex derived voice over data signals to and from the derived voice over data termination device; and
    a customer premise equipment located at the client premise, wherein the customer premise equipment is coupled to the connection between the client premise and the derived voice over data termination device, and wherein the customer premise equipment is configured to receive base band voice signals and digital data signals,
    wherein the connection between the client premise and the derived voice over data termination device includes a plain old telephone service splitter, the plain old telephone service splitter being connected to a port of the digital subscriber line access multiplexer and to a port of the derived voice over data termination device.

2. The system of claim 1, wherein the connection between the plain old telephone service splitter and the port of the digital subscriber line access multiplexer carries digital data signals and the connection between the plain old telephone service splitter and the port of the derived voice over data termination device carries base band voice signals.

3. A system using derived voice over data technology to provide analog voice telephony to a client premise, comprising:
    a derived voice over data termination device located outside of the client premise, said derived voice over data termination device configured to convert between base band signals and derived voice over data signals utilizing derived voice over data technology;
    a connection between the client premise and the derived voice over data termination device, wherein the connection between the client premise and the derived voice over data termination device is over a twisted wire pair and carries analog frequencies, and wherein the connection between the client premise and the derived voice over data termination device includes a main distribution frame coupled between the derived voice over data termination device and the client premise; and
    a digital subscriber line access multiplexer coupled between the derived voice over data termination device and one of an ATM switch, a frame relay switch, and a router, the digital subscriber line access multiplexer being configured to multiplex derived voice over data signals to and from the derived voice over data termination device.

4. The system of claim 3, wherein said connection between the client premise and the derived voice over data termination device is powered by said derived voice over data termination device.

5. The system of claim 3, wherein the derived voice over data termination device is connected to at least one port of the digital subscriber line access multiplexer, each of said at least one port is selected from a group consisting of digital subscriber line (DSL), DS1, DS3, OC-3, OC-12, Ethernet, E3, E1, and OC48.

6. The system of claim 5, wherein the DSL includes asymmetric DSL (ADSL), single line DSL (SDSL), very high rate DSL (VDSL), high bit-rate DSL (HDSL), and rate adaptive DSL (RADSL).

7. The system of claim 3, wherein the derived voice over data termination device is selected from the group consisting of voice over ATM, voice over data network, voice over IP, and voice over frame relay termination devices.

8. The system of claim 3, wherein the derived voice over data termination device is located in a wire center.

9. The system of claim 3, wherein the derived voice over data termination device is configured to receive and generate from base band voice signals packetized digital voice data.

10. A method for providing base band voice telephony to a client telephone, comprising:
    providing a derived voice over data termination device in a wire center, the derived voice over data termination device being configured to convert between base band signals and derived voice over data signals utilizing derived voice over data technology;
    providing a base-band analog connection between the client telephone and the derived voice over data termination device over a twisted wire pair via a splitter;
    transmitting base-band analog voice signals between the client telephone and the derived voice over data termination device in the wire center;

transmitting derived voice over data signals between the derived voice over data termination device and a voice gateway connected to a public switched telephone network by multiplexing the derived voice over data signals through a digital subscriber line access multiplexer, the digital subscriber line access multiplexer being coupled between the derived voice over data termination device and the voice gateway; and transmitting digital data signals between a client premise equipment and the splitter over said twisted wire pair.

11. The method of claim 10, further comprising transmitting digital data signals between the splitter and the digital subscriber line access multiplexer.

* * * * *